United States Patent
Takamune

(10) Patent No.: US 8,823,971 B2
(45) Date of Patent: Sep. 2, 2014

(54) EXTERNAL STORING DEVICE, IMAGE PROCESSING APPARATUS AND IMAGE FORMING APPARATUS RESPECTIVELY COMPRISING THE EXTERNAL STORING DEVICE

(75) Inventor: Toshiaki Takamune, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1357 days.

(21) Appl. No.: 12/031,313

(22) Filed: Feb. 14, 2008

(65) Prior Publication Data

US 2008/0198406 A1 Aug. 21, 2008

(30) Foreign Application Priority Data

Feb. 16, 2007 (JP) .................................. 2007-036162

(51) Int. Cl.
*G06F 3/12* (2006.01)
*G06F 21/60* (2013.01)

(52) U.S. Cl.
CPC .................................... *G06F 21/608* (2013.01)
USPC .......... 358/1.15; 717/168; 717/174; 717/131; 358/1.16; 358/444

(58) Field of Classification Search
USPC ........................................ 359/1.15; 358/1.15
See application file for complete search history.

(56) References Cited

U.S. PATENT DOCUMENTS

2006/0031826 A1* 2/2006 Hiramatsu et al. ............. 717/168
2006/0130004 A1* 6/2006 Hughes et al. ................. 717/131

FOREIGN PATENT DOCUMENTS

| JP | 10283320 A | * 10/1998 |
| JP | 2001-092618 A | 4/2001 |
| JP | 2004-213469 A | 7/2004 |

* cited by examiner

*Primary Examiner* — Houshang Safaipour
*Assistant Examiner* — Richa Mishra
(74) *Attorney, Agent, or Firm* — Panitch Schwarze Belisario & Nadel LLP

(57) ABSTRACT

The present invention has an object to make the unallowed image forming apparatus be unable to use option data or option program even if having read out them from the allowed image forming apparatus having the option data or the option program. In an image forming apparatus, a program executing section judges whether the image forming apparatus meets identification information described in a license key stated in activating data in activating key file when executing Java program serving as option program, and executes the Java program in the case that the image forming apparatus meets the identification information.

40 Claims, 12 Drawing Sheets

EXTERNAL STORING DEVICE, IMAGE PROCESSING APPARATUS AND IMAGE FORMING APPARATUS RESPECTIVELY COMPRISING THE EXTERNAL STORING DEVICE

BACKGROUND OF THE INVENTION

1. Field of the Invention

The invention relates to an external storing device that receives a supply of option program or option data from an external apparatus and stores the option program or option data; image processing apparatus and image forming apparatus respectively comprises the external storing device.

2. Related Background Art

In conventional image forming apparatus, in general, according to different price, different function is provided. Therefore, in the case that such conventional image forming apparatus adds new function, after option data or option program for executing the new function and efficient program for activating (in a use allowance state) the option data or the option program are provided from a server or an external apparatus such as PC and the like, it is necessary to use the provided efficient program to activate the provided option data or the provided option program (e.g. refer to patent document 1). Then, the conventional image forming apparatus executes the activated option data or option program. Further, an image forming system comprising plural image forming apparatuses is disclosed (e.g. refer to patent document 2).

Patent document 1: Japan patent publication 2004-213469.
Patent document 2: Japan patent publication 2001-092618.

However, in the image forming system comprising the external apparatus and the above-stated plural conventional image forming apparatuses, with respect to one image forming apparatus in which the option data/option program and the efficient program are provided, there is a problem that other image forming apparatus which is not allowed to use reads out the option program and the efficient program and executes them, or, reads the option data and the efficient program and uses them.

SUMMARY OF THE INVENTION

It is, therefore, in order to solve the above problem, an object of the invention to provide an external storing device that stores the option data or the option program and makes the other unallowed image forming apparatus be unable to use the option data or the option program even if having read out them from the allowed image forming apparatus having the option data or the option program; image processing apparatus and image forming apparatus respectively comprises the external storing device.

According to the present invention, there is provided an external storing device removably installed to an image processing apparatus, comprising a first program section that obtains distinguishment information fixedly belonging to the image processing apparatus from the image processing apparatus, obtains identification information capable of using a program stored in a storing section to correspond to the distinguishment information, and deletes a self program file from the external storing device after the identification information is obtained; and a second program section that obtains identification information made by the first program section, obtains distinguishment information fixedly belonging to the image processing apparatus from the image processing apparatus, and allows to use program in the external storing device on the basis of the obtained identification information and the obtained distinguishment information.

Moreover, according to the present invention, there is also provided an external storing device removably installed to an image processing apparatus, comprising a first program section that obtains distinguishment information fixedly belonging to the image processing apparatus from the image processing apparatus, obtains identification information capable of using data stored in a storing section to correspond to the distinguishment information, and deletes a self program file from the external storing device after the identification information is obtained; and a second program section that obtains identification information made by the first program section, obtains distinguishment information fixedly belonging to the image processing apparatus from the image processing apparatus, and allows to use data in the external storing device on the basis of the obtained identification information and the obtained distinguishment information.

Moreover, according to the present invention, there is also provided an external storing device removably installed to an image forming apparatus, comprising a first program section that obtains distinguishment information fixedly belonging to the image forming apparatus from the image forming apparatus, obtains identification information capable of using a program stored in a storing section to correspond to the distinguishment information, and deletes a self program file from the external storing device after the identification information is obtained; and a second program section that obtains identification information made by the first program section, obtains distinguishment information fixedly belonging to the image forming apparatus from the image forming apparatus, and allows to use program in the external storing device on the basis of the obtained identification information and the obtained distinguishment information.

Moreover, according to the present invention, there is also provided an external storing device removably installed to an image forming apparatus, comprising a first program section that obtains distinguishment information fixedly belonging to the image forming apparatus from the image forming apparatus, obtains identification information capable of using data stored in a storing section to correspond to the distinguishment information, and deletes a self program file from the external storing device after the identification information is obtained; and a second program section that obtains identification information made by the first program section, obtains distinguishment information fixedly belonging to the image forming apparatus from the image forming apparatus, and allows to use data in the external storing device on the basis of the obtained identification information and the obtained distinguishment information.

Moreover, according to the present invention, there is provided an image processing apparatus, comprising an external storing device, wherein the external storing device includes a first program section that obtains distinguishment information fixedly belonging to the image processing apparatus from the image processing apparatus, obtains identification information capable of using a program stored in a storing section to correspond to the distinguishment information, and deletes a self program file from the external storing device after the identification information is obtained; and a second program section that obtains identification information made by the first program section, obtains distinguishment information fixedly belonging to the image processing apparatus from the image processing apparatus, and allows to use program in the external storing device on the basis of the obtained identification information and the obtained distinguishment information.

Moreover, according to the present invention, there is also provided an image processing apparatus, comprising an external storing device, wherein the external storing device includes a first program section that obtains distinguishment information fixedly belonging to the image processing apparatus from the image processing apparatus, obtains identification information capable of using data stored in a storing section to correspond to the distinguishment information, and deletes a self program file from the external storing device after the identification information is obtained; and a second program section that obtains identification information made by the first program section, obtains distinguishment information fixedly belonging to the image processing apparatus from the image processing apparatus, and allows to use data in the external storing device on the basis of the obtained identification information and the obtained distinguishment information.

Moreover, according to the present invention, there is provided an image forming apparatus, comprising an external storing device, wherein the external storing device includes a first program section that obtains distinguishment information fixedly belonging to the image forming apparatus from the image forming apparatus, obtains identification information capable of using a program stored in a storing section to correspond to the distinguishment information, and deletes a self program file from the external storing device after the identification information is obtained; and a second program section that obtains identification information made by the first program section, obtains distinguishment information fixedly belonging to the image forming apparatus from the image forming apparatus, and allows to use program in the external storing device on the basis of the obtained identification information and the obtained distinguishment information.

Moreover, according to the present invention, there is also provided an image forming apparatus, comprising an external storing device, wherein the external storing device includes a first program section that obtains distinguishment information fixedly belonging to the image forming apparatus from the image forming apparatus, obtains identification information capable of using data stored in a storing section to correspond to the distinguishment information, and deletes a self program file from the external storing device after the identification information is obtained; and a second program section that obtains identification information made by the first program section, obtains distinguishment information fixedly belonging to the image forming apparatus from the image forming apparatus, and allows to use data in the external storing device on the basis of the obtained identification information and the obtained distinguishment information.

Effect of the Present Invention

According to the present invention, it is possible to make the other unallowed image forming apparatus be unable to use the option data or the option program even if having read out them from the allowed image forming apparatus having the option data or the option program.

The above and other objects and features of the present invention will become apparent from the following detailed description and the appended claims with reference to the accompanying drawings.

DETAILED DESCRIPTION OF THE PREFERRED EMBODIMENTS

Embodiments of the invention will be described in detail hereinbelow with reference to the drawings.

Embodiment 1

Figure 1:
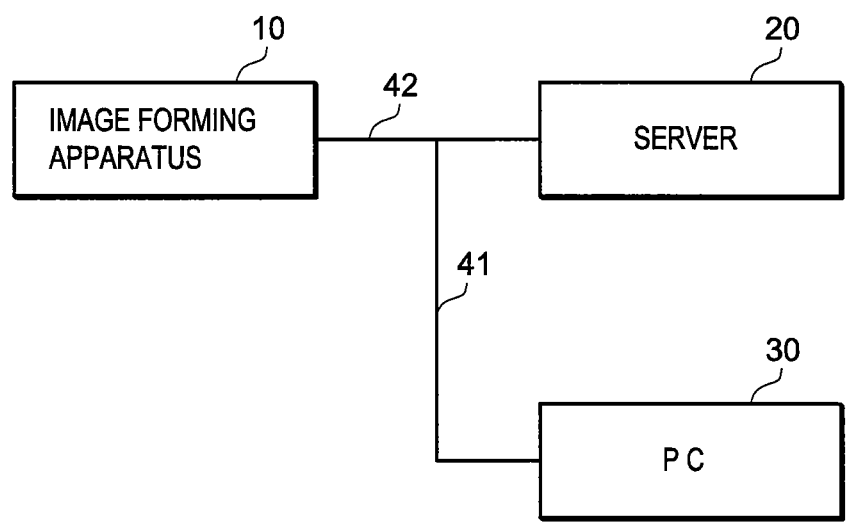
FIG. 1 is a block diagram showing a use state of an image forming apparatus in embodiment 1 of the present invention.
Figure 2:
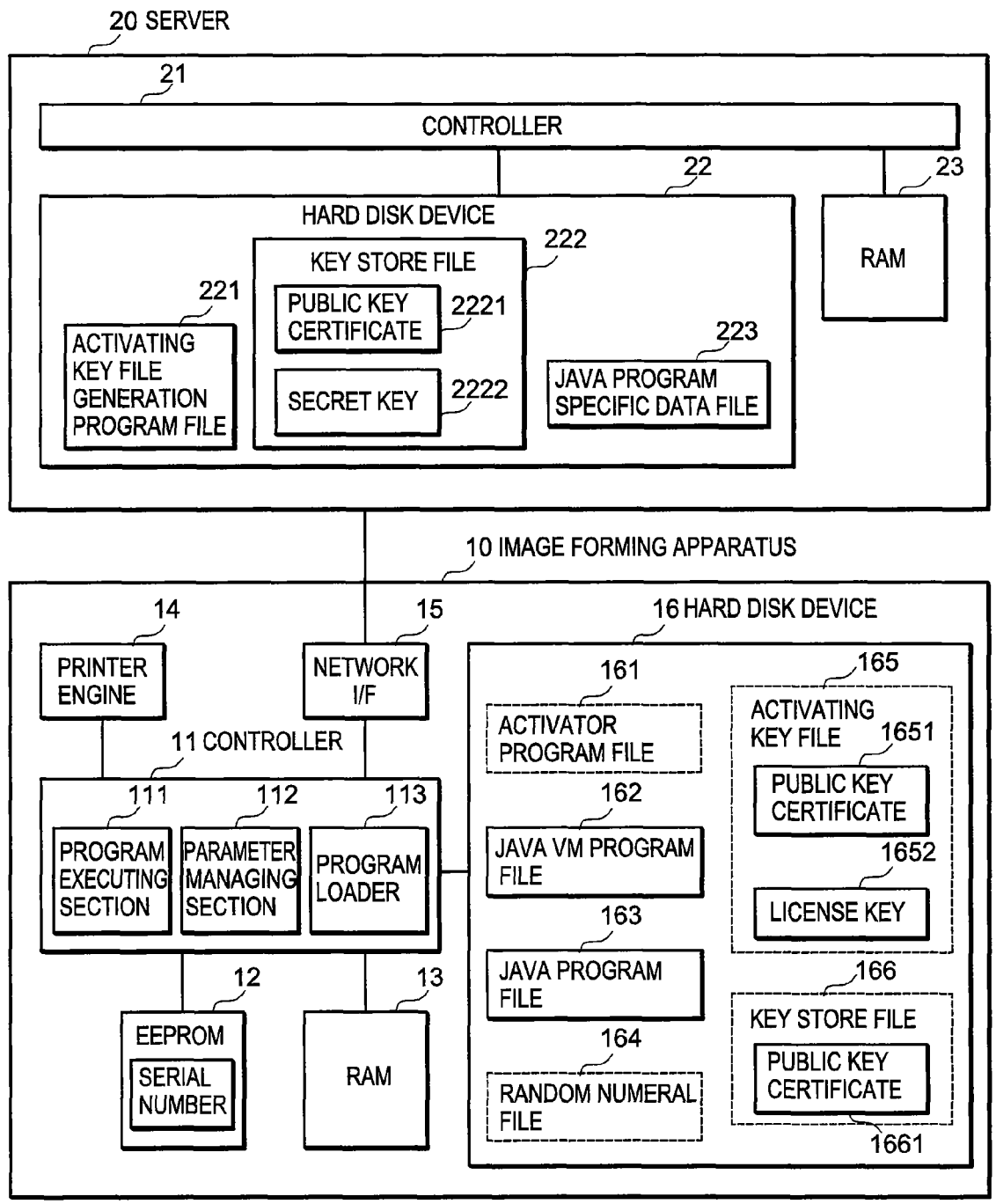
FIG. 2 is a block diagram showing a structure of an image forming apparatus in embodiment 1 of the present invention.

FIG. 1 is a block diagram showing a use state of an image forming apparatus in embodiment 1 of the present invention; and FIG. 2 is a block diagram showing a structure of an image forming apparatus in embodiment 1 of the present invention.

As shown by FIG. 1, an image forming apparatus 10 in embodiment 1, for example, as a printer, is connected with a server 20 via cable 41, also is connected with a PC 30 via cable 42. As shown by FIG. 2, the image forming apparatus 10 comprises a controller 11, an EEPROM 12, a RAM 13, a printer engine 14, a network I/F 15 and a hard disk device 16.

The controller 11 forms a program executing section 111, a parameter managing section 112, and a program loader 113 that are stated below through executing main control program stored in a ROM (not shown).

The program executing section 111 executes activator program stored in an activator program file 161 existing in the hard disk device 16; Java (Trademark) VM (Virtual Machine) program stored in a Java VM program file 162 existing in the hard disk device 16 and Java program stored in a Java program file 163 existing in the hard disk device 16. Moreover, regarding operation using the activator program file 161, the Java VM program file 162 and the Java program file 163 of the program executing section 111, it will be explained in the following operation description of the image forming apparatus 10.

The parameter managing section 112, when a request to obtain a serial number for distinguishing the image forming apparatus 10 serving as a self apparatus 10 is inputted from the program executing section 111, in the case that the serial number assigned to the self apparatus 10 is not stored in the EEPROM 12, outputs a notification representing that the serial number does not exist to the program executing section 111; in the case that the serial number assigned to the self apparatus 10 is stored in the EEPROM 12, reads out the serial number from the EEPROM 12 and outputs the serial number to the program executing section 111.

Further, the parameter managing section 112, according to the request of the program executing section 111, reads out a value (hereinafter: fixed value) that is a fixed value only belonging to the self apparatus 10 and can not be obtained from external from the EEPROM 12 that previously stores the fixed value; and outputs the fixed value to the program executing section 111. In the embodiment 1, as the fixed value, a value of a predetermined part of data written in a ROM storing main control program is used.

The program loader 113, according to the request of the program executing section 111, stores the activator program in the activator program file 161 existing in the hard disk device 16; the Java VM program in a Java VM program file 162 existing in the hard disk device 16 and the Java program in a Java program file 163 existing in the hard disk device 16 to the RAM 13.

The EEPROM 12 stores the above-stated serial number and the above-stated fixed value.

The RAM 13 temporarily stores necessary program and necessary data while the program executing section 111 performs process. That is, the RAM 13 stores the activator program stored in the activator program file 161; the Java VM program stored in a Java VM program file 162; the Java program stored in a Java program file 163; random numeral stored in a random numeral file 164; activating key data stored in an activating key file 165; and key store data stored in a key store file 166.

The printer engine 14 prints print data expanded into bitmap data.

The network I/F 15 is an interface to send and receive data between the self apparatus 10 and the server 20 and between the self apparatus 10 and the PC 30.

The hard disk device 16 is attachable and removable; and has the activator program file 161, the Java VM program file 162, the Java program file 163, the random numeral file 164, the activating key file 165 and the key store file 166.

The activator program file 161 generates a registration key that will be stated below, and stores activator program for sending the generated registration key to the server 20. Further, the activator program file 161 receives activating key file from the server 20, and stores the activating key file into the hard disk device 16 as the activating key file 165. Activator program is a program for activating Java program when using Java VM program that will be stated below to execute the Java program, and is provided when the Java program and the Java VM program are provided from the server 20 serving as a host apparatus.

The Java VM program file 162 is a file to store the Java VM program that is a program to execute the Java program and serves as option program.

The Java program file 163 is a file to store the Java program serving as option program described in Java language for adding new option function into the self apparatus 10. Here, with respect to the Java program stored in the Java program file 163, a name of FeliCa (Trademark of Sony) is used as Java program name.

The FeliCa is a program to perform an identification print that temporarily stores print job data encoded by password that is sent from the PC 30 and is stored in FeliCa IC card into the RAM 13, then decodes identification print data stored in the RAM 13 to perform a print process through using password read by the FeliCa IC card.

The random numeral file 164 is a file to store random numeral generated by a random numeral generator (not shown).

The activating key file 165 stores the activating key file received from the server 20. In the activating key data stored in the activating key file 165, activating data is stored in which a public key certificate 1651 that is encoded and a license key 1652 that is electronically signed and is encoded are described. Moreover, the license key 1652 makes a valid time limit of the Java VM program stored in the Java VM program file 162 serve as identification information.

The key store file 166 stores key store data in which a public key certificate 1661 is described. The key store data in which the public key certificate 1661 is described is made when identification process is initially performed.

The server 20 comprises a controller 21, a hard disk device 22 and a RAM 23.

The controller 21, according to main control program stored in a ROM (not shown), sequentially reads out activating key file generation program stored in an activating key file generation program file 221 that will be stated below; and generates activating key file through executing the activating file generation program and using key store data stored in a key store file 222 and Java program specific data stored in a Java program specific data file 223. Further, the controller 21 sends the generated activating key file to the image forming apparatus 10 as the activating key file 165 existing in the hard disk device 16 of the image forming apparatus 10.

The hard disk device 22 stores the activating key file generation program file 221; the key store file 222; and the Java program specific data file 223.

The activating key file generation program file 221 stores the activating key file generation program for making the controller 21 generate the activating key file 165 existing in the hard disk device 16 of the image forming apparatus 10.

The key store file 222 stores key store data needed for making the controller 21 generate activating key. In the key store data, a public key certificate 2221 and a secret key 2222 are described.

The Java program specific data file 223 stores information for specifying Java program stored in the Java VM program file 162 of the image forming apparatus 10. The information is composed of valid time limit of the Java program, version of the Java program, serial number of the Java program, serial number of the image forming apparatus 10 and the like that serve as identification information mentioned below.

The RAM 23 temporarily stores information needed when the controller 21 makes the activating key file. For example, registration key sent from the image forming apparatus 10 is stored.

The following is to explain operation of the image forming apparatus 10 in the embodiment 1 of the present invention.

Figure 3:
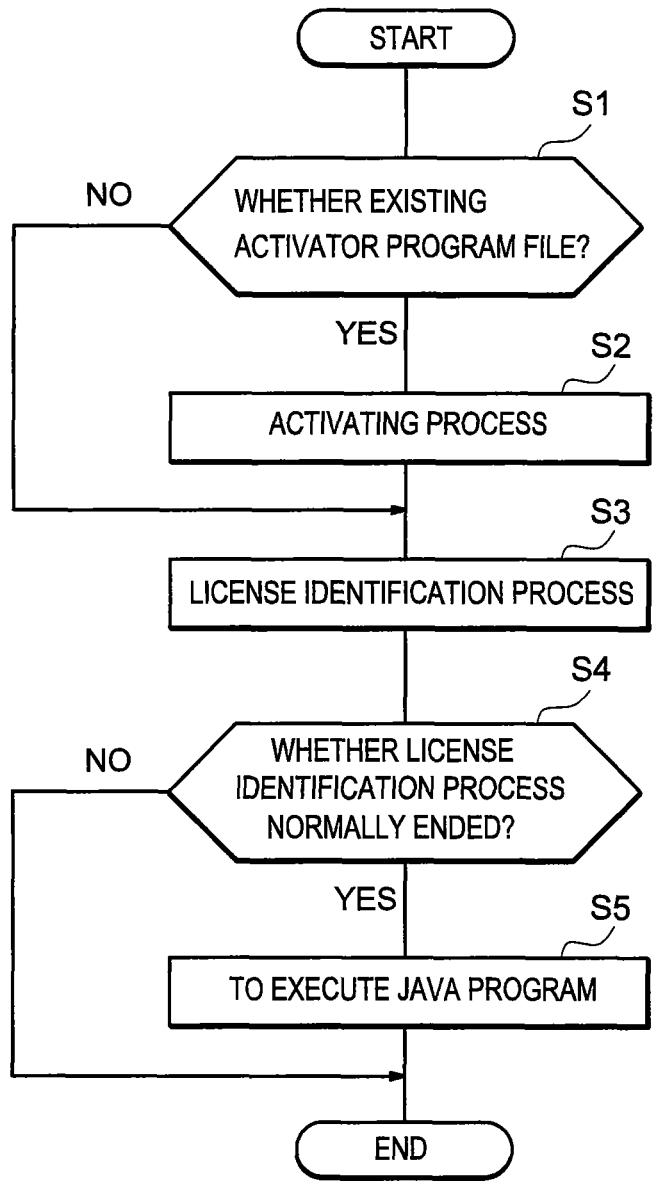
FIG. 3 is a flowchart showing operation of an image forming apparatus in embodiment 1 of the present invention.
Figure 4:
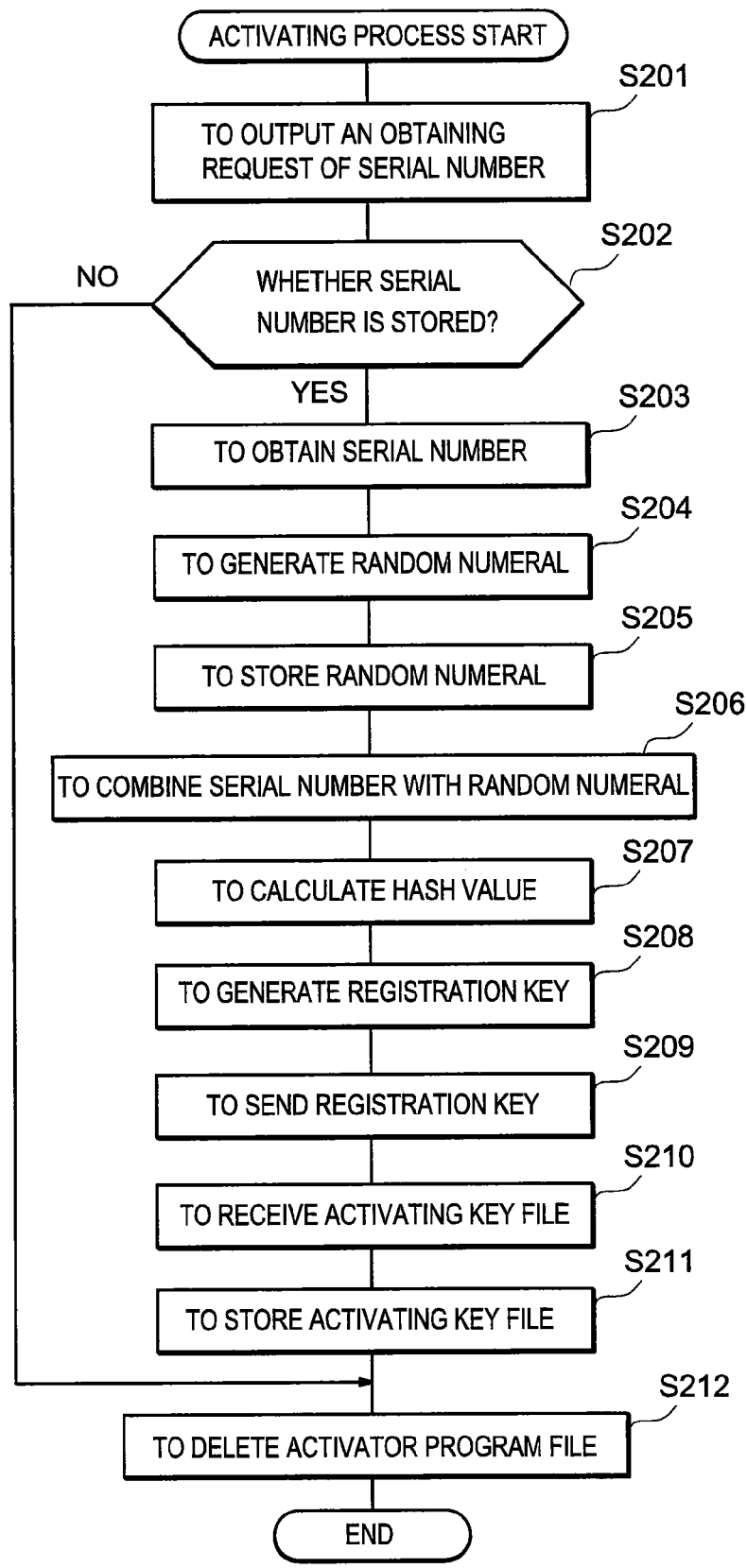
FIG. 4 is a flowchart showing operation of an activating process in step S2.
Figure 5:
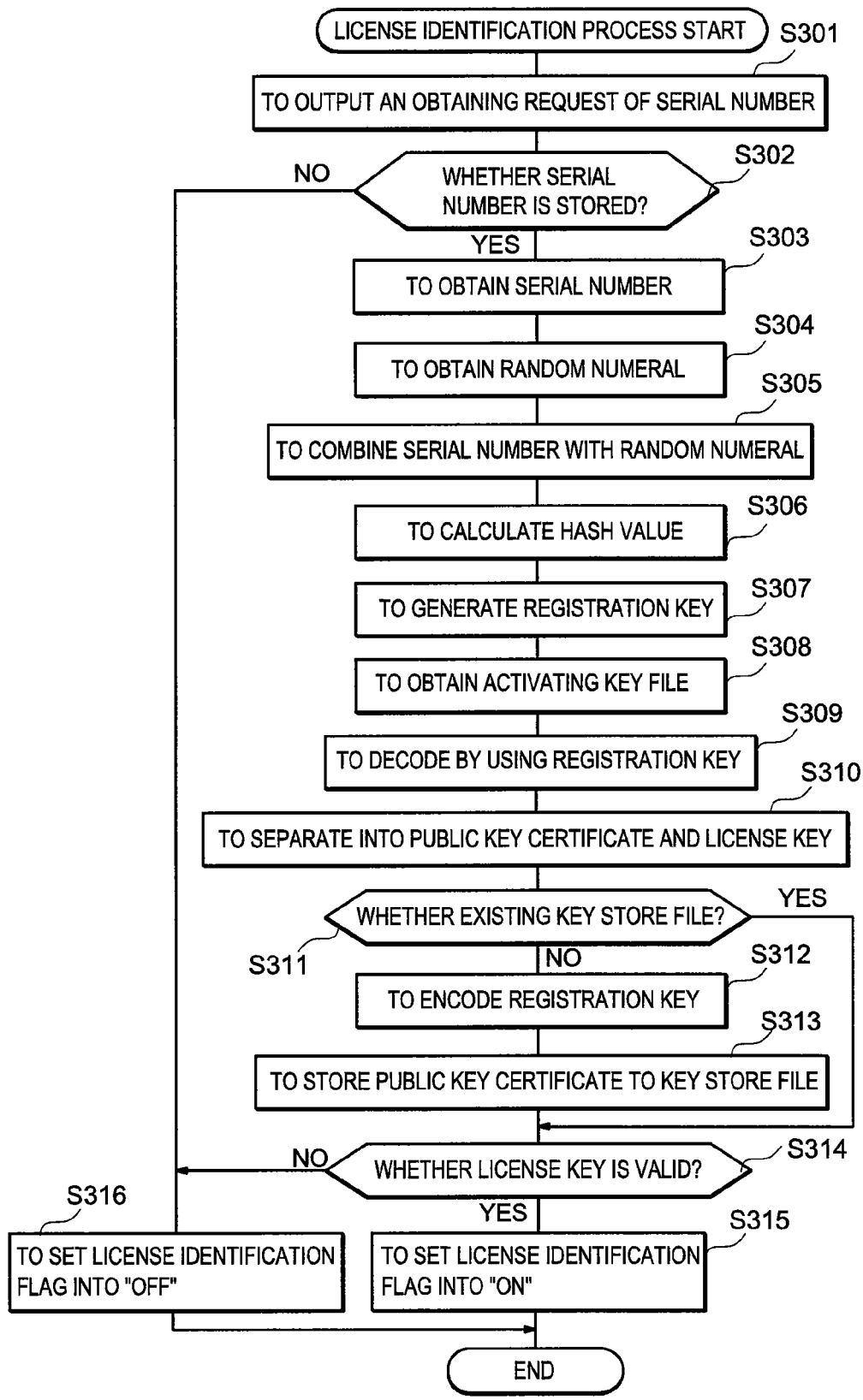
FIG. 5 is a flowchart showing operation of a license identifying process in step S3.

FIG. 3 is a flowchart showing operation of an image forming apparatus in embodiment 1 of the present invention; FIG. 4 is a flowchart showing operation of an activating process in step S2; and FIG. 5 is a flowchart showing operation of a license identifying process in step S3.

Next, operation is explained until executed the Java program (application program) described in Java language.

Initially, after an execution request of Java program is sent from the PC 30 via the cable 42, the program executing section 111 of the controller 11 outputs a request to read out activator program stored in the activator program file 161 to the program loader 113.

The program loader 113 tries to access the activator program file 161 existing in the hard disk device 16, and judges whether the activator program file 161 exists in the hard disk device 16 (Step S1). When the program loader 113 judged that the activator program file 161 does not exist in the hard disk device 16, step S3 is processed; when the program loader 113 judged that the activator program file 161 exists in the hard disk device 16, the program executing section 111 sequentially reads out the activator program in the hard disk device 16 and stores all of the activator program into the RAM 13.

Further, the program executing section 111 sequentially reads out the activator program stored in the RAM 13, and executes activating process for activating the Java VM program (for allowing process) (Step S2). Regarding the activating process, it will be stated below.

After the activating process ended, the program executing section 111 outputs a request to read out the Java VM program stored in the Java VM program file 162 to the program loader 113.

The program loader 113 sequentially reads out the Java VM program stored in the Java VM program file 162 existing in the hard disk device 16, and stores the read all of the Java VM program into the RAM 13. Then, the program loader 113 outputs a notification to the program executing section 111 for representing that the Java VM program has been stored in the RAM 13.

The program executing section 111, after received the notification, sequentially reads out the Java VM program stored in the RAM 13, and executes a license identification process which serves as a preprocessing of the Java VM program and will be stated below (Step S3). Next, the program executing section 111 judges whether the license identification process normally ended or not through judging a license identification flag stored in the RAM 13 is "ON" or "OFF" in the license identification process (Step 4).

In the case that the program executing section 111 judges that the license identification process did not normally end, that is, the license identification flag stored in the RAM 13 is "OFF", the program executing section 111 does not start the Java VM program substance serving as option program and ends the process without executing the Java program. In the case that the program executing section 111 judges that the license identification process normally end, that is, the license identification flag stored in the RAM 13 is "ON", the program executing section 111 outputs a request to read out Java program stored in the Java program file 163 to the program loader 113.

The program loader 113, after received the request from the program executing section 111, sequentially reads out the Java program from the Java program file 163, and stores the read Java program into the RAM 13. Then, the program loader 113 outputs a notification to the program executing section 111 for representing that the Java program has been stored in the RAM 13.

Then, the program executing section 111 sequentially reads out the Java program stored in the RAM 13 and executes the Java program (Step 5), further ends the process of the Java program.

The following is to explain the activating process in step S2 through referring to FIG. 4.

In step S1, the program executing section 111, when judged that the activator program file 161 exists in the hard disk device 16, outputs a request to read out the activator program file 161 existing in the hard disk device 16 to the program loader 113.

The program loader 113, after received the request from the program executing section 111, sequentially reads out the activator program stored in the activator program file 161, and stores the all activator program into the RAM 13. Then, the program loader 113 outputs a notification representing that the activator program has been stored in the RAM 13 to the program executing section 111.

The program executing section 111, after received the notification, outputs a request to obtain serial number assigned to the self apparatus 10 to the parameter managing section 112 (Step S201).

The parameter managing section 112, after received the request from the program executing section 111, judges whether the serial number assigned to the self apparatus 10 is stored in the EEPROM 12 (Step S202).

On the one hand, in the case that the parameter managing section 112 judged that the serial number assigned to the self apparatus 10 is not stored in the EEPROM 12, the parameter managing section 112 outputs a notification representing that the serial number does not exist to the program executing section 111.

The program executing section 111, after received the notification representing that the serial number does not exist from the parameter managing section 112, confirms that it is not allowed to execute the Java program, that is, it is in an unjust state because the serial number does not exist. Then step S212 is processed.

On the other hand, in the case that the parameter managing section 112 judged that the serial number assigned to the self apparatus 10 is stored in the EEPROM 12, the parameter managing section 112 reads out the serial number from the EEPROM 12, and outputs the serial number to the program executing section 111.

The program executing section 111, after received the serial number from the parameter managing section 112 (Step S203), makes the RAM 13 store the serial number; then makes a random numeral generator (not shown) generate random numeral (Step S204); and makes the random numeral file 164 in the hard disk device 16 store the generated random numeral (Step S205).

Then, the program executing section 111 reads out the serial number from the RAM 13 and reads out the random numeral from the random numeral file 164; performs an AND calculation or an OR calculation or the like with respect to the serial number and the random numeral; and generates a character string (Step S206). Next, the program executing section 111 calculates a Hash value through supplying the generated character string to a Hash function (Step S207).

Then, the program executing section 111 outputs a request to the parameter managing section 112 to read out a fixed value that is stored in the EEPROM 12 and can not be obtained from external. As stated above, the fixed value is a value of a predetermined part of data written in a ROM storing main control program.

The parameter managing section 112, according to the request of the program executing section 111, reads out the fixed value from the EEPROM 12; and outputs the fixed value to the program executing section 111.

The program executing section 111, after received the fixed value from the parameter managing section 112, performs an AND calculation or an OR calculation with respect to the Hash value calculated above and the fixed value, and generates a character string (Step S208). The character string is used below as registration key.

Next, the program executing section 111 sends the generated registration key to the server 20 via the network I/F 15 (Step S209). Then, the program executing section 111, after received activating key file from the server 20 via the network I/F 15 (Step S210), makes the hard disk device 16 store the activating key file as the activating key file 165 (Step S211). Further, the program executing section 111, according to instruction of activator program, deletes the activator program file 161 from the hard disk device 16 (Step S212), and ends the activating process. Since that, there is no the activating process to be performed again.

The following is to explain a license process in step S3 by referring to FIG. 5.

The program executing section 111, after ended the activation process stated above, outputs a request to the program loader 113 to reads out Java VM program stored in the Java VM program file 162.

The program loader 113 accesses to the Java VM program file 162 existing in the hard disk device 16, and sequentially reads out the Java VM program from the Java VM program file 162, stores the all Java VM program to the RAM 13, and outputs a notification representing that the Java VM program has been stored in the RAM 13 to the program executing section 111.

The program executing section 111, after received the notification from the program loader 113, according to the Java VM program stored in the RAM 13, initially outputs an obtaining request to the parameter managing section 112 to obtain a serial number of the self apparatus 10 (Step S301).

The parameter managing section 112, after received the obtaining request from the program executing section 111, judges whether the serial number assigned to the self apparatus 10 is stored in the EEPROM 12 (Step S302).

On the one hand, in the case that the parameter managing section 112 judged that the serial number assigned to the self apparatus 10 is not stored in the EEPROM 12, the parameter managing section 112 outputs a notification representing that the serial number does not exist to the program executing section 111.

The program executing section 111, after received the notification representing that the serial number does not exist from the parameter managing section 112, confirms that it is not allowed to execute the Java program, that is, it is in an unjust state because the serial number does not exist, and ends the license process.

On the other hand, in the case that the parameter managing section 112 judged that the serial number assigned to the self apparatus 10 is stored in the EEPROM 12, the parameter managing section 112 reads out the serial number from the EEPROM 12, and outputs the serial number to the program executing section 111.

The program executing section 111, after received the serial number from the parameter managing section 112 (Step S303), makes the RAM 13 store the serial number; then reads out random numeral from the random numeral file 164 existing in the hard disk device 16 (Step S304).

Then, the program executing section 111 reads out the serial number from the RAM 13, performs an AND calculation or an OR calculation or the like with respect to the serial number and the random numeral; and generates a character string (Step S305). Next, the program executing section 111 calculates a Hash value through supplying the generated character string to a Hash function (Step S306).

Then, the program executing section 111, after calculated the Hash value, outputs a request to the parameter managing section 112 to read out the fixed value stored in the EEPROM 12.

The parameter managing section 112, according to the request of the program executing section 111, reads out the fixed value which has been used in activating process from the EEPROM 12; and outputs the fixed value to the program executing section 111.

The program executing section 111 performs an AND calculation or an OR calculation with respect to the calculated above Hash value and fixed value, and generates a registration key composed of a character string (Step S307). The registration key is the same as the registration key generated in the activating process.

Next, the program executing section 111 outputs a request to the program loader 113 to reads out activating key data stored in the activating key file 165 existing in the hard disk device 16.

The program loader 113 accesses to the activating key file 165 existing in the hard disk device 16, and reads out the activating key data from the activating key file 165, stores the activating key data to the RAM 13 (Step S308), and outputs a notification representing that the activating key data has been stored in the RAM 13 to the program executing section 111.

Then, the program executing section 111, according to the notification, reads out the activating key data from the RAM 13, decodes the read activating key data by using the registration key, and stores again the decoded activating key data into the RAM 13 (Step S309).

Further, the program executing section 111 separates and reads out the public key certificate 1651 and the license key 1652 described in the decoded activating key data stored in the RAM 13 (Step S310), and stores the public key certificate 1651 and the license key 1652 into the RAM 13.

Next, the program executing section 111 outputs a request to the program loader 113 to reads out key store data stored in the key store file 166 existing in the hard disk device 16.

The program loader 113 tries to accesses to the key store file 166 existing in the hard disk device 16, and judges whether the key store file 166 exists in the hard disk device 16 (Step S311).

On the one hand, in the case that the key store file 166 exists in the hard disk device 16, the program loader 113 outputs a notification representing that the key store file 166 exists in the hard disk device 16 to the program executing section 111.

The program executing section 111, after received the notification representing that the key store file 166 exists in the hard disk device 16 from the program loader 113, moves process to step S314.

On the other hand, in the case that the key store file 166 does not exist in the hard disk device 16, the program loader 113 outputs a notification representing that the key store file 166 does not exist in the hard disk device 16 to the program executing section 111.

The program executing section 111, after received the notification representing that the key store file 166 does not exist in the hard disk device 16 from the program loader 113, generates the key store file 166 which is not stored yet. Further, the program executing section 111 reads out a public key certificate 1661 stored in the RAM 13 and reads out the registration key stored in the RAM 13, then encodes the registration key (Step S312).

Continuously, the program executing section 111 uses the encoded registration key as a password to generates key store data in which the public key certificate 1661 is described, and writes the key store data into the key store file 166 (Step S313).

Then, the program executing section 111 reads out the license key 1652 stored in the RAM 13, and judges whether the license key 1652 is valid or not with respect to the self apparatus 10 (Step S314).

On the one hand, in the case that the license key 1652 is not valid with respect to the self apparatus 10, that is, the current time has exceeded the valid time limit of program as identification information, the program executing section 111 sets the license identification flag stored in the RAM 13 into "OFF" (Step S316), and ends the license identification process.

On the other hand, in the case that the license key 1652 is valid with respect to the self apparatus 10, that is, the current time does not exceed the valid time limit of program as identification information, the program executing section 111 sets the license identification flag stored in the RAM 13 into "ON" (Step S315), and ends the license identification process.

Figure 6:
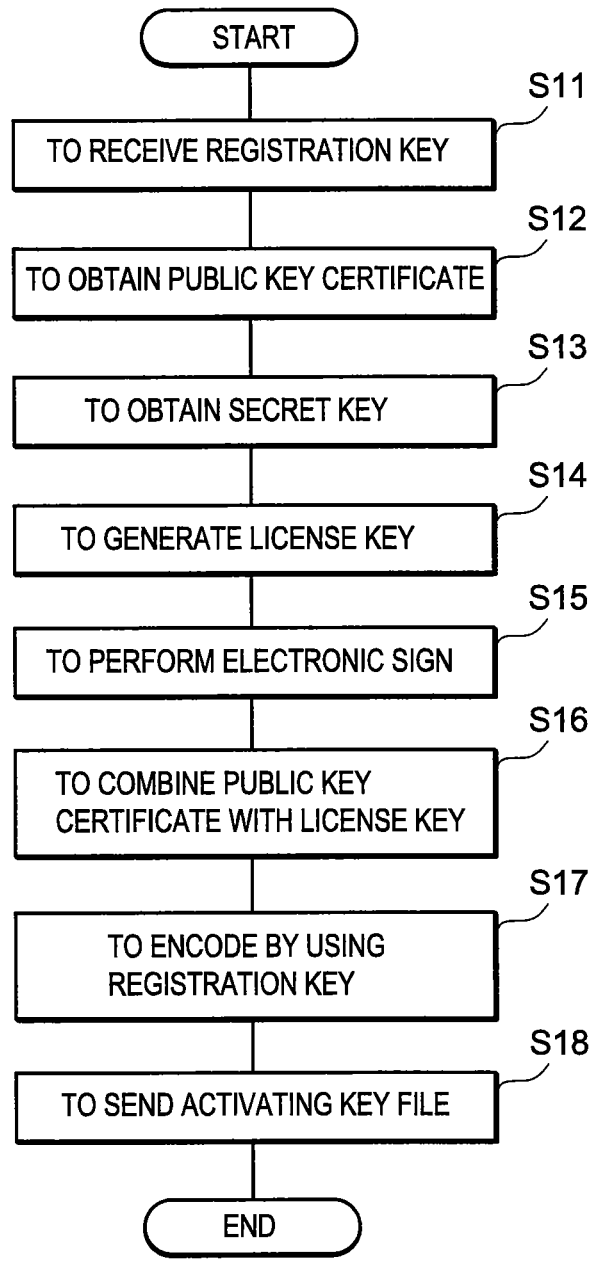
FIG. 6 is a flowchart showing operation of an activating key file generating process executed by server.

FIG. 6 is a flowchart showing operation of an activating key file generating process executed by server.

The controller 21 of the server 20, after received registration key sent from the image forming apparatus 10 via the cable 42 (Step S11), makes the RAM 23 store the registration key. Then, the controller 21 executes the following process according to activating key file generation program stored in the activating key file generation program file 221 existing in the hard disk device 22. That is, the controller 21 reads out the key store data which is stored in the key store file 222 and in which the public key certificate 2221 and the secret key 2222 are described, reads out the public key certificate 2221 from the key store data and makes the RAM 23 store the public key certificate 2221 (Step S12). Further, the controller 21 reads out the secret key 2222 from the key store data and makes the RAM 23 store the secret key 2222 (Step S13).

Then, the controller 21 reads out the valid time limit of program in Java specific data stored in the Java program specific data file 223 existing in the hard disk device 22. Next, the controller 21 generates a license key as identification information on the basis of the valid time limit (Step S14).

The controller 21, after generated the license key, reads out the secret key 2222 from the key store data in RAM 23, in which the public key certificate 2221 and the secret key 2222 are described; and performs an electronic sign with respect to the license key by the secret key 2222 (Step S15). Then, the controller 21 reads out the public key certificate 2221 from the key store data in RAM 23, in which the public key certificate 2221 and the secret key 2222 are described; and generates data through combining the public key certificate 2221 and the electronically signed license key (Step S16).

Further, the controller 21 reads out the registration key from the RAM 23; encodes the previously generated data by the registration key (Step S17); generates activating key data; then generates activating key file to store the activating key data into the RAM 23. Next, the controller 21 sends the activating key file previously generated in the RAM 23 to the image forming apparatus 10 via the cable 41 (Step S18); and ends the process.

According to the embodiment 1, because the program executing section 111 executes the Java program serving as option program only in the case that the self apparatus 10 meets the identification information stated in the license key, even if the other image forming apparatus that is not allowed to use the Java program read out the Java program, but it is impossible to use the Java program.

Further, according to the embodiment 1, because the program executing section 111 performs the identification process to judge whether the self apparatus 10 meets the identification information described in the license key 1652 in the activating key file 165, even if the other image forming apparatus read out the Java program and the Java VM program serving as option program, it is impossible to read out activator program. Therefore, the other image forming apparatus that is not allowed to use the Java program can not activate the Java program. As a result, it is impossible to use the Java program serving as option program even if it has been read out.

Embodiment 2

Figure 7:
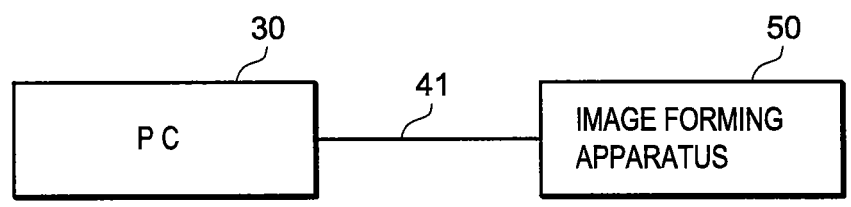
FIG. 7 is a block diagram showing a use state of an image forming apparatus in embodiment 2 of the present invention.
Figure 8:
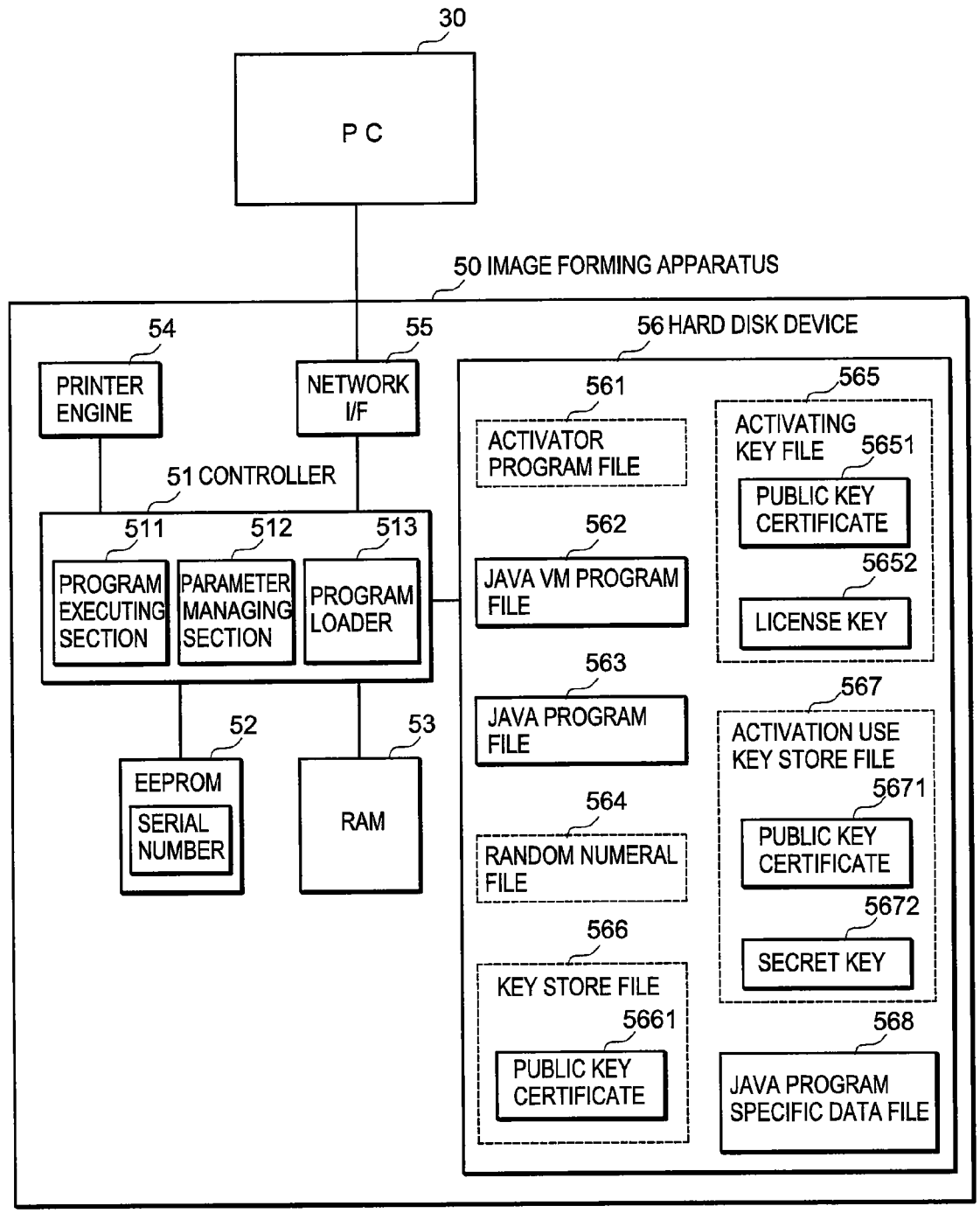
FIG. 8 is a block diagram showing a structure of an image forming apparatus in embodiment 2 of the present invention.

FIG. 7 is a block diagram showing a use state of an image forming apparatus in embodiment 2 of the present invention; and FIG. 8 is a block diagram showing a structure of an image forming apparatus in embodiment 2 of the present invention.

As shown by FIG. 7, an image forming apparatus 50 in embodiment 2 is connected with a PC 30 via a cable 41. As shown by FIG. 8, the image forming apparatus 50 comprises a controller 51, an EEPROM 52, a RAM 53, a printer engine 54, a network I/F 55 and a hard disk device 56.

The controller 51 forms a program executing section 511, a parameter managing section 512, and a program loader 513 that are stated below through executing main control program stored in a ROM (not shown).

The program executing section 511 of the controller 51 has the same function as the program executing section 111 in embodiment 1, further has other function. That is, after registration key is stored in the RAM 53, the program executing section 511 outputs a request to the program loader 513 to read out activation use key store data stored in an activation use key store file 567 of the hard disk device 56. Further, the program executing section 511, after received a notification representing that the activation use key store file 567 does not exist from the program loader 513, deletes an activator program file 561.

The program loader 513 has the same function as the program loader 113 in embodiment 1, further has other function. That is, the program loader 513 performs an access with respect to the activation use key store file 567, and judges whether the activation use key store file 567 exists in the hard disk device 56.

Further, in the case that the activation use key store file 567 does not exist in the hard disk device 56, the program loader 513 outputs a notification representing the judged result to the program executing section 511; in the case that the activation use key store file 567 exists in the hard disk device 56, the program loader 513 reads out the activation use key store data from the activation use key store file 567, makes the RAM 53 store the activation use key store data, then outputs a notification representing that activation use key store data has been stored in the RAM 53 to the program executing section 511.

Furthermore, the program loader 513, after deleted the activation use key store file 567 from the hard disk device 56, outputs a notification representing that the activation use key store file 567 is deleted to the program executing section 511.

The EEPROM 52, the RAM 53, the printer engine 54 and network I/F 55 respectively are the same as the EEPROM 12, the RAM 13, the printer engine 14 and the network I/F 15 in embodiment 1.

The hard disk device 56 is attachable and removable; and has the activator program file 561, a Java VM program file 562, a Java program file 563, a random numeral file 564, an activating key file 565, a key store file 566, the activation use key store file 567 and a Java program specific data file 568. Here, the activator program file 561, the Java VM program file 562, the Java program file 563, the random numeral file 564, the activating key file 565 and the key store file 566 respectively are the same as the activator program file 161, the Java VM program file 162, the Java program file 163, the random numeral file 164, the activating key file 165 and the key store file 166 in embodiment 1.

The activation use key store file 567 stores activation use key store data in which public key certificate 5671 and secret key 5672 are described as information for generating the activating key file 565.

The Java program specific data file 568 stores information for specifying Java program stored in the Java program file 563. In the information is composed of, for example, valid time limit of the Java program, version of the Java program, serial number of the Java program, serial number of the image forming apparatus 50 and the like that serve as identification information mentioned below.

The following is to explain operation of the image forming apparatus 50 in the embodiment 2 of the present invention.

Figure 9:
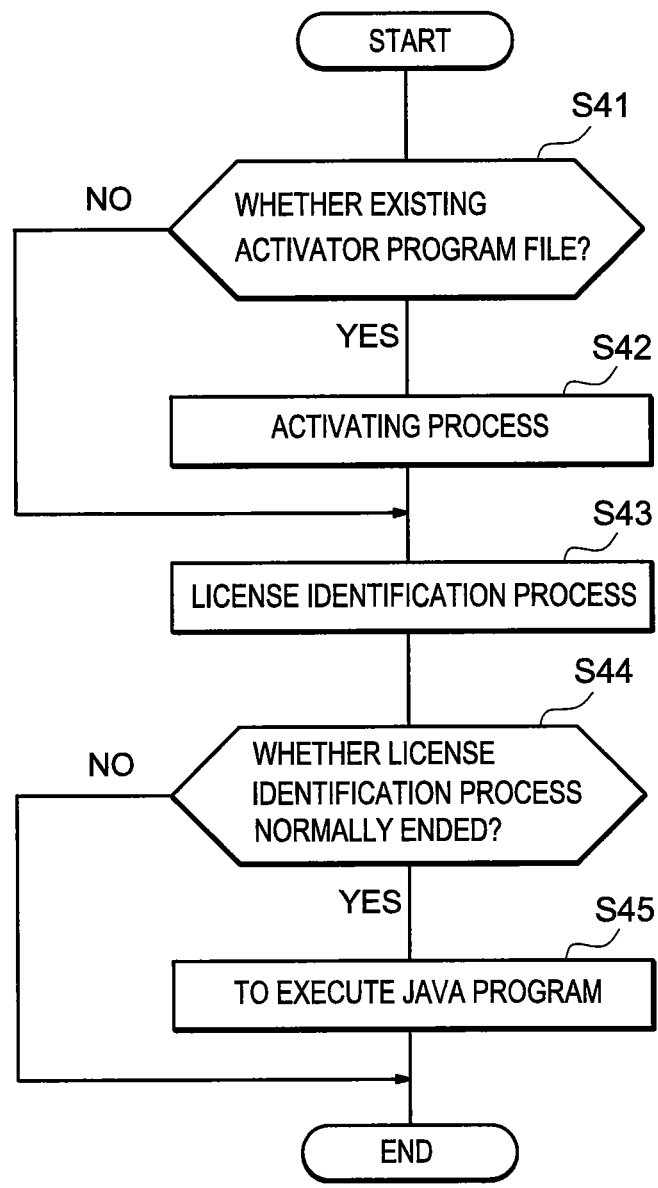
FIG. 9 is a flowchart showing operation of an image forming apparatus in embodiment 2 of the present invention.
Figure 10:
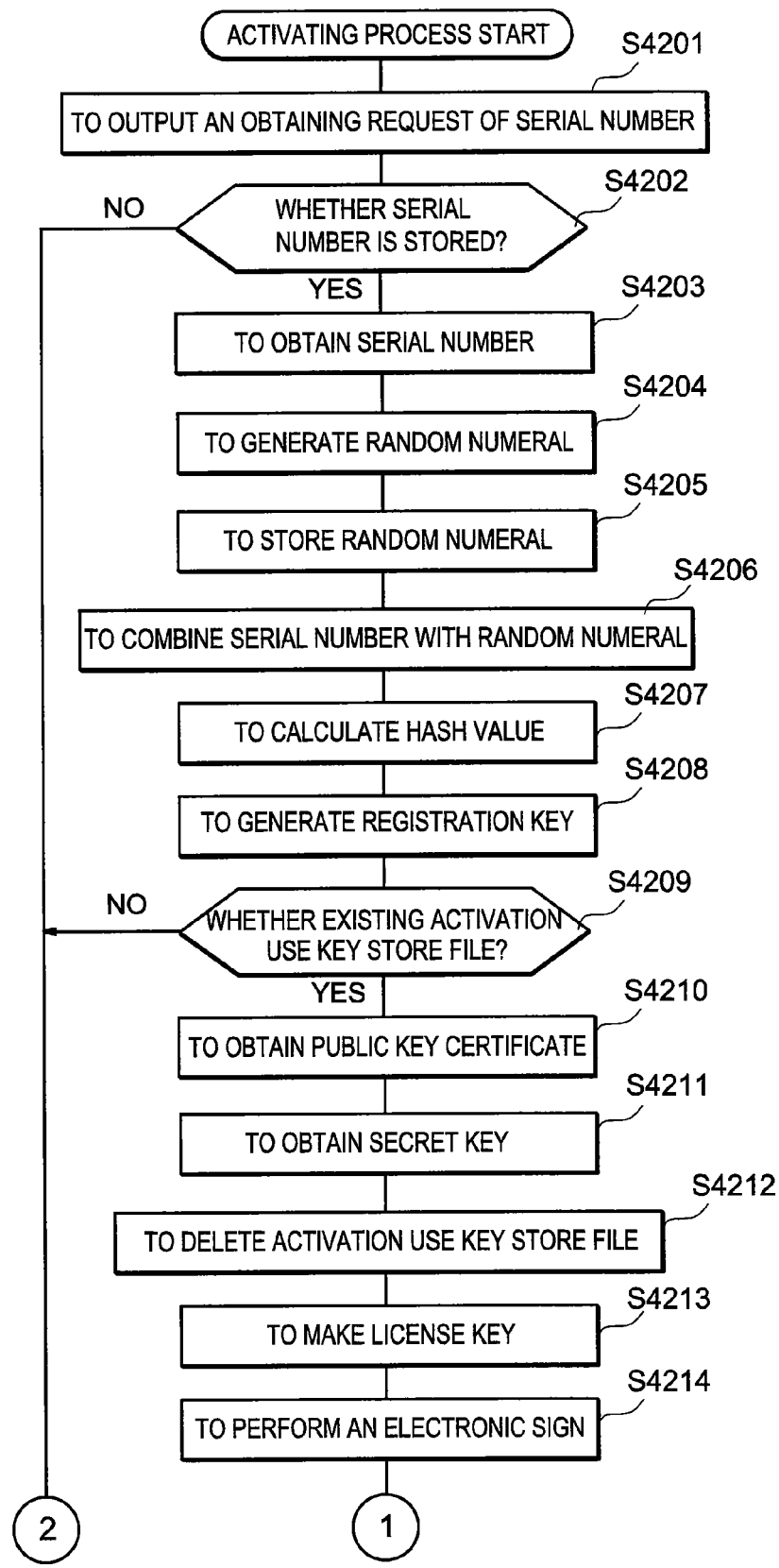
FIG. 10 is a first flowchart showing operation of an activating process in step 42.

FIG. 9 is a flowchart showing operation of an image forming apparatus in embodiment 2 of the present invention; FIG. 10 is a first flowchart showing operation of an activating process in step 42; and FIG. 11 is a second flowchart showing operation of an activating process in step 42.

Thereinafter, operation is explained until executed the Java program (application program) described in Java language. A judgment process in step S41 to judge whether activating program file exists or not; a judgment process in step S44 to judge whether a license identification process normally ended or not; and an execution process in step S45 to execute the Java program respectively are the same as the judgment process in step S1 of the embodiment 1 to judge whether activating program file exists or not; the judgment process in step S4 of the embodiment 1 to judge whether a license identification process normally ended or not; and the execution process in step S5 of the embodiment 1 to execute the Java program. The following is to explain an activating process in step S42 and a license identification process in step S43.

Figure 11:
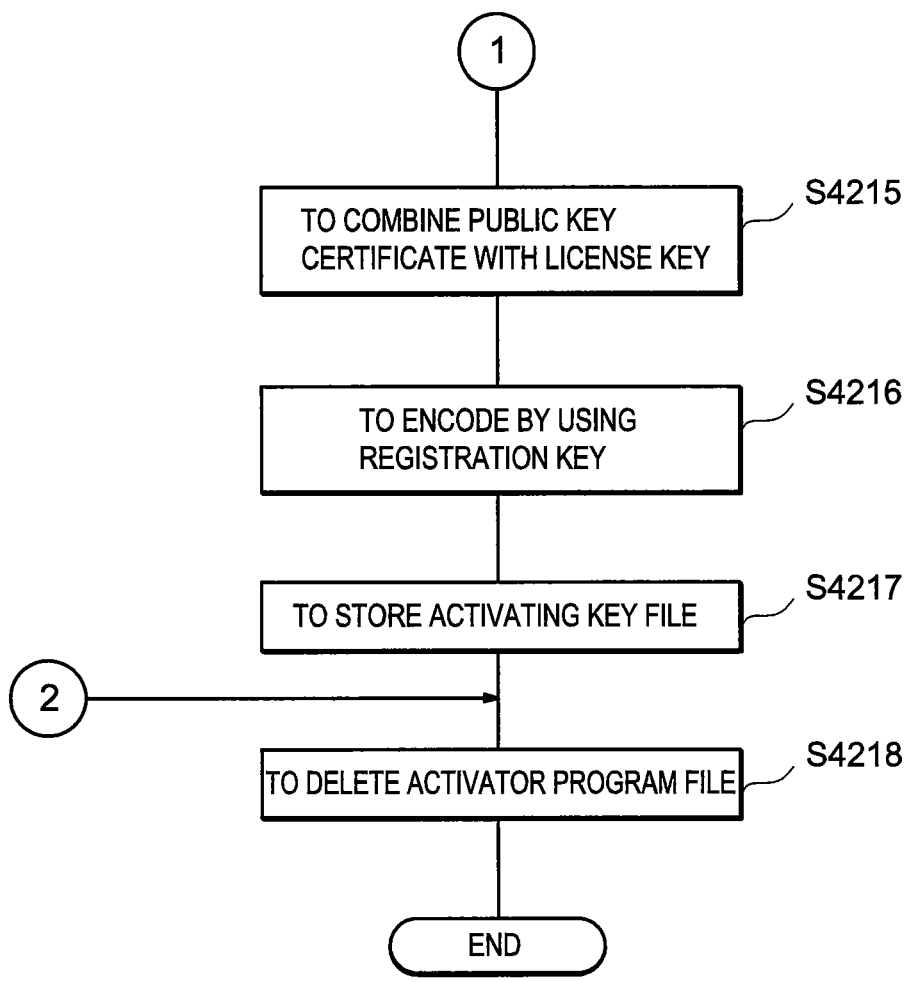
FIG. 11 is a second flowchart showing operation of an activating process in step 42.

Initially, the activating process in step S42 is explained by referring to FIGS. 10 and 11.

In the activating process, steps S4201-S4208, that is, operations from an output process of an obtaining request of serial number in step S4201 to a generation process of registration key in step S4208 respectively are the same as the steps S201-S208, that is, these operations from the output process of an obtaining request of serial number in step S201 to the generation process of registration key in step S208.

In step S4208, the program executing section 511 generates a registration key and stores the registration key into the RAM 53, then outputs a request to the program loader 513 to read out activation use key store data stored in the activation use key store file 567 of the hard disk device 56.

According to the request, the program loader 513 performs an access with respect to the activation use key store file 567, and judges whether the activation use key store file 567 exists in the hard disk device 56 (Step S4209).

On the one hand, the program loader 513, when judged that the activation use key store file 567 does not exist in the hard disk device 56, outputs a notification representing the judged result to the program executing section 511.

The program executing section 511, after received the notification from the program loader 513, judges that it is not an unjust state, then moves the process to step S4318.

On the other hand, the program loader 513, when judged that the activation use key store file 567 exists in the hard disk device 56, reads out activation use key store data from the activation use key store file 567 and makes the RAM 53 store the activation use key store data. Next, the program loader 513 outputs a notification representing that the activation use key store data has been stored in the RAM 53 to the program executing section 511.

The program executing section 511, after received the notification from the program loader 513, reads out the public key certificate 5671 described in the activation use key store data stored in the RAM 53 (Step S4210). Next, the program executing section 511 reads out the secret key 5672 described in the activation use key store data stored in the RAM 53 (Step S4211). Then, the program executing section 511 outputs a request to the program loader 513 to delete the activation use key store file 567.

The program loader 513, according to the request, after deleted the activation use key store file 567 from the hard disk device 56 (Step S4212), outputs a notification representing that the activation use key store file 567 has been deleted to the program executing section 511.

The program executing section 511, after received the notification from the program loader 513, reads out valid time limit and version of Java program serving as identification information used in license process executed in the image forming apparatus 50 from Java program specific data described in the Java program specific data file 568 stored in the hard disk device 56, and generates a license key 5652 in which identification information composed of the valid time limit and the version of Java program (Step S4213).

Next, the program executing section 511 reads out the secret key 5672 from the RAM 53, and performs an electronic sign with respect to the license key 5652 by using the secret key 5672 (Step S4214). Then, the program executing section 511 reads out public key certificate 5651 from the RAM 53, and generates data through combining the public key certificate 5651 and the license key 5652 previously electronically signed (Step S4215). Continuously, the program executing section 511 encodes the generated data by using the registration key stored in the RAM 53 (Step S4216), and stores the encoded data into activating key file 565 existing in the hard disk device 56 (Step S4217). Then, the program executing section 511 outputs a request to the program loader 513 to delete the activator program file 561.

The program loader 513, according to the request outputted from the program executing section 511, deletes the activator program file 561 from the hard disk device 56 (Step S4218), and ends the activating process. After that, the activating process is not executed again.

Next, the license process in step S43 is explained.

Figure 12:
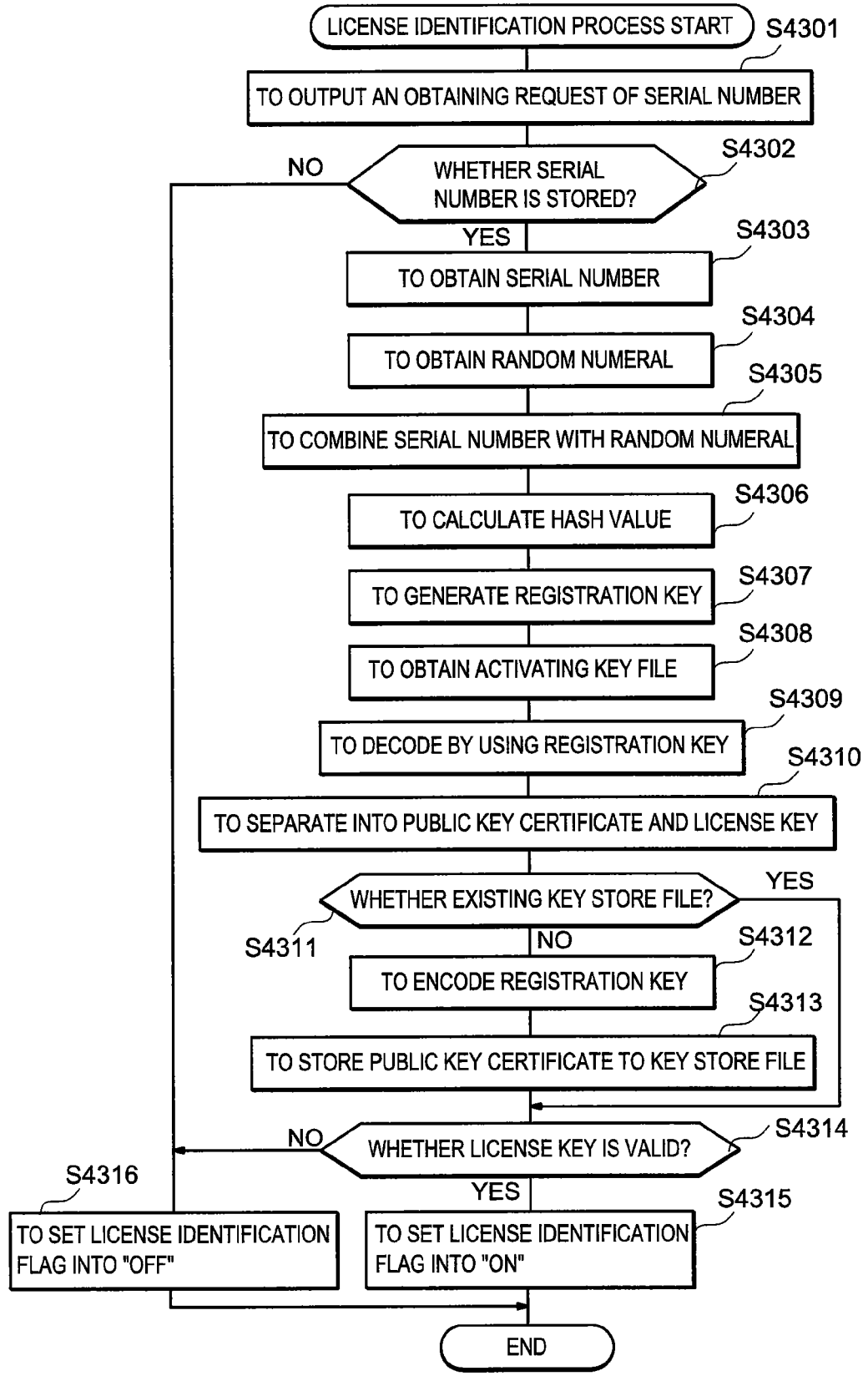
FIG. 12 is a flowchart showing operation of a license identifying process in step 43.

FIG. 12 is a flowchart showing operation of a license identifying process in step 43.

In the license process, steps S4301-S4313, that is, operations from an output process of obtaining request to obtain serial number in step S4301 to a store process to store public key certificate 5661 into key store file in step S4313 respectively are the same as the steps S301-S313 in embodiment 1, that is, the operations in embodiment 1 from the output process of obtaining request to obtain serial number in step S301 to the store process to store public key certificate 1661 into key store file in step S313. Therefore, the following is to explain processes after the store process in step S4313.

In step S4313, the program executing section 511 uses the encoded registration key as a password to generates key store data in which the public key certificate 5661 is described, and writes the key store data into the key store file 566. Then, the program executing section 511 reads out the license key 5652 stored in the RAM 53, and judges whether the identification information of the license key 5652 is valid or not with respect to the self apparatus 50 (Step S4314).

On the one hand, in the case that the license key 5652 is not valid with respect to the self apparatus 10, that is, the current time has exceeded the valid time limit of program as identification information or the version is different, the program executing section 511 sets the license identification flag stored in the RAM 53 into "OFF" (Step S4316), and ends the license identification process.

On the other hand, in the case that the license key 1652 is valid with respect to the self apparatus 10, that is, the current time does not exceed the valid time limit of program as identification information and the version is the same, the program executing section 511 sets the license identification flag stored in the RAM 53 into "ON" (Step S4315), and ends the license identification process.

According to the embodiment 2, not only there is the same effect as that in embodiment 1; but also there is the following effect. That is, because the program executing section 511 generates the license key 5652 in the activating key file 565 from the Java program specific data stored in the Java program specific data file 568, it is unnecessary to set a server for issuing activating key.

In the above-stated embodiments 1 and 2, as the option program, such case relative to Felica is explained. However, option font and the like for printing may be used.

Further, in the above-stated embodiments 1 and 2, the image forming apparatus 10 or 50 is explained. However, the present invention may be applied to image processing apparatus.

In the above stated explanation, only such case is explained that the present invention is applied to a printer. However, the present invention is not limited in the case, the present invention also can be applied to various devices such as scanner, copying apparatus, facsimile apparatus, multiplex apparatus and the like, as an image forming apparatus. Further, in the embodiments 1 and 2, the hard disk device 16 is explained as external storing device, however, such medium capable of writing as CD-R, DVD-RAM, USB flash memory and the like may be used as the external storing device.

The present invention is not limited to the foregoing embodiments but many modifications and variations are possible within the spirit and scope of the appended claims of the invention.

What is claimed is:

1. An external storing device removably installed to an image processing apparatus, comprising:
 a first program section executable by the image processing apparatus that:
  (i) obtains distinguishment information fixedly belonging to the image processing apparatus from the image processing apparatus, the distinguishment information comprising first distinguishment information and second distinguishment information,
  (ii) determines whether a self program file is stored in the external storing device,
  (iii) reads out the self-program file from the external storing device and stores the self-program file in a storing section of the image processing apparatus when the self-program file is determined to be stored in the external storing device,
  (iv) obtains identification information capable of using a program stored in a storing section of the external storing device to correspond to the distinguishment information in response to determining that the self program file is stored in the external storing device,
  (v) generates an encoded identification information that is an encoding of the identification information using the first distinguishment information and the second distinguishment information,
  (vi) stores the encoded identification information in the external storing device, and
  (vii) deletes the self program file from the external storing device after the identification information is obtained, wherein the self program file is stored in the external storing device before the external storing device is installed to the image processing apparatus; and
 a second program section executable by the image processing apparatus that:
  (i) obtains the encoded identification information from the first program section,
  (ii) obtains the distinguishment information fixedly belonging to the image processing apparatus from the image processing apparatus,
  (iii) generates a decoded identification information that is a decoding of the encoded identification information using the distinguishment information, and
  (iv) determines a use permission or non-use permission of the program that is stored in the external storing device based on the decoded identification information.

2. An external storing device removably installed to an image processing apparatus, the external storing device comprising:
 a first program section executable by the image processing apparatus that:
  (i) obtains distinguishment information fixedly belonging to the image processing apparatus from the image processing apparatus, the distinguishment information comprising first distinguishment information and second distinguishment information,
  (ii) determines whether a self program file is stored in the external storing device,
  (iii) reads out the self-program file from the external storing device and stores the self-program file in a storing section of the image processing apparatus when the self-program file is determined to be stored in the external storing device,
  (iv) obtains identification information capable of using data stored in a storing section of the external storing device to correspond to the distinguishment information in response to determining that the self program file is stored in the external storing device,
  (v) generates an encoded identification information that is an encoding of the identification information using the first distinguishment information and the second distinguishment information,
  (vi) stores the encoded identification information in the external storing device, and
  (vii) deletes the self program file from the external storing device after the identification information is obtained, wherein the self program file is stored in the external storing device before the external storing device is installed to the image processing apparatus; and
 a second program section executable by the image processing apparatus that:
  (i) obtains the encoded identification information from the first program section,
  (ii) obtains the distinguishment information fixedly belonging to the image processing apparatus from the image processing apparatus, and
  (iii) generates a decoded identification information that is a decoding of the encoded identification information using the distinguishment information, and
  (iv) determines a use permission or non-use permission of the program that is stored in the external storing device based on the decoded identification information.

3. An external storing device removably installed to an image forming apparatus, comprising:
 a first program section executable by the image forming apparatus that:
  (i) obtains distinguishment information fixedly belonging to the image forming apparatus from the image forming apparatus, the distinguishment information comprising first distinguishment information and second distinguishment information, (ii) determines whether a self program file is stored in the external storing device, (iii) reads out the self-program file from the external storing device and stores the self-program file in a storing section of the image processing apparatus when the self-program file is determined to be stored in the external storing device, (iv) obtains identification information capable of using a program stored in a storing section of the external storing device to correspond to the distinguishment information in response to determining that the self program file is stored in the external storing device, (v) generates an encoded identification information that is an encoding of the identification information using the first distinguishment information and the second distinguishment information, (vi) stores the encoded identification information in the external storing device, and (vii) deletes the self program file from the external storing device after the identification information is obtained, wherein the self program file is stored in the external storing device before the external storing device is installed to the image forming apparatus; and a second program section executable by the image forming apparatus that:
(i) obtains the encoded identification information from the first program section,
(ii) obtains the distinguishment information fixedly belonging to the image forming apparatus from the image forming apparatus,
(iii) generates a decoded identification information that is a decoding of the encoded identification information using the distinguishment information, and
(iv) determines a use permission or non-use permission of the program that is stored in the external storing device based on the decoded identification information.

4. An external storing device removably installed to an image forming apparatus, comprising:

a first program section executable by the image forming apparatus that:
(i) obtains distinguishment information fixedly belonging to the image forming apparatus from the image forming apparatus, the distinguishment information comprising first distinguishment information and second distinguishment information
(ii) determines whether a self program file is stored in the external storing device,
(iii) reads out the self-program file from the external storing device and stores the self-program file in a storing section of the image processing apparatus when the self-program file is determined to be stored in the external storing device,
(iv) obtains identification information capable of using data stored in a storing section of the external storing device to correspond to the distinguishment information in response to determining that the self program file is stored in the external storing device,
(v) generates an encoded identification information that is an encoding of the identification information using the first distinguishment information and the second distinguishment information,
(vi) stores the encoded identification information in the external storing device, and
(vii) deletes the self program file from the external storing device after the identification information is obtained, wherein the self program file is stored in the external storing device before the external storing device is installed to the image forming apparatus; and a second program section executable by the image forming apparatus that:
(i) obtains the encoded identification information from the first program section,
(ii) obtains the distinguishment information fixedly belonging to the image forming apparatus from the image forming apparatus,
(iii) generates a decoded identification information that is a decoding of the encoded identification information using the distinguishment information, and
(iv) determines a use permission or non-use permission of the program that is stored in the external storing device based on the decoded identification information.

5. An image processing apparatus, comprising:

an external storing device removably installed to the image processing apparatus, wherein the external storing device includes:

a first program section executable by the image processing apparatus that:
(i) obtains distinguishment information fixedly belonging to the image processing apparatus from the image processing apparatus, the distinguishment information comprising first distinguishment information and second distinguishment information,
(ii) determines whether a self program file is stored in the external storing device,
(iii) reads out the self-program file from the external storing device and stores the self-program file in a storing section of the image processing apparatus when the self-program file is determined to be stored in the external storing device,
(iv) obtains identification information capable of using a program stored in a storing section of the external storing device to correspond to the distinguishment information in response to determining that the self program file is stored in the external storing device,
(v) generates an encoded identification information that is an encoding of the identification information using the first distinguishment information and the second distinguishment information,
(vi) stores the encoded identification information in the external storing device, and
(vii) deletes the self program file from the external storing device after the identification information is obtained, wherein the self program file is stored in the external storing device before the external storing device is installed to the image processing apparatus; and a second program section executable by the image processing apparatus that:
(i) obtains the encoded identification information from the first program section,
(ii) obtains the distinguishment information fixedly belonging to the image processing apparatus from the image processing apparatus,
(iii) generates a decoded identification information that is a decoding of the encoded identification information using the distinguishment information, and
(iv) determines a use permission or non-use permission of the program that is stored in the external storing device based on the decoded identification information.

6. An image processing apparatus, comprising:
an external storing device removably installed to the image processing apparatus, wherein the external storing device includes:
a first program section executable by the image processing apparatus that:
  (i) obtains distinguishment information fixedly belonging to the image processing apparatus from the image processing apparatus, the distinguishment information comprising first distinguishment information and second distinguishment information,
  (ii) determines whether a self program file is stored in the external storing device,
  (iii) reads out the self-program file from the external storing device and stores the self-program file in a storing section of the image processing apparatus when the self-program file is determined to be stored in the external storing device,
  (iv) obtains identification information capable of using data stored in a storing section of the external storing device to correspond to the distinguishment information in response to determining that the self program file is stored in the external storing device,
  (v) generates an encoded identification information that is an encoding of the identification information using the first distinguishment information and the second distinguishment information,
  (vi) stores the encoded identification information in the external storing device, and
  (vii) deletes the self program file from the external storing device after the identification information is obtained, wherein the self program file is stored in the external storing device before the external storing device is installed to the image processing apparatus; and
a second program section executable by the image processing apparatus that:
  (i) obtains the encoded identification information from the first program section,
  (ii) obtains the distinguishment information fixedly belonging to the image processing apparatus from the image processing apparatus,
  (iii) generates a decoded identification information that is a decoding of the encoded identification information using the distinguishment information, and
  (iv) determines a use permission or non-use permission of the program that is stored in the external storing device based on the decoded identification information.

7. An image forming apparatus, comprising:
an external storing device removably installed to the image forming apparatus, wherein the external storing device includes:
a first program section executable by the image forming apparatus that:
  (i) obtains distinguishment information fixedly belonging to the image forming apparatus from the image forming apparatus, the distinguishment information comprising first distinguishment information and second distinguishment information,
  (ii) determines whether a self program file is stored in the external storing device,
  (iii) reads out the self-program file from the external storing device and stores the self-program file in a storing section of the image processing apparatus when the self-program file is determined to be stored in the external storing device,
  (iv) obtains identification information capable of using a program stored in a storing section of the external storing device to correspond to the distinguishment information in response to determining that the self program file is stored in the external storing device,
  (v) generates an encoded identification information that is an encoding of the identification information using the first distinguishment information and the second distinguishment information,
  (vi) stores the encoded identification information in the external storing device, and
  (vii) deletes the self program file from the external storing device after the identification information is obtained, wherein the self program file is stored in the external storing device before the external storing device is installed to the image forming apparatus; and
a second program section executable by the image forming apparatus that:
  (i) obtains the encoded identification information from the first program section,
  (ii) obtains the distinguishment information fixedly belonging to the image forming apparatus from the image forming apparatus,
  (iii) generates a decoded identification information that is a decoding of the encoded identification information using the distinguishment information, and
  (iv) determines a use permission or non-use permission of the program that is stored in the external storing device based on the decoded identification information.

8. An image forming apparatus, comprising:
an external storing device removably installed to the image forming apparatus, wherein the external storing device includes:
a first program section executable by the image forming apparatus that:
  (i) obtains distinguishment information fixedly belonging to the image forming apparatus from the image forming apparatus, the distinguishment information comprising first distinguishment information and second distinguishment information,
  (ii) determines whether a self program file is stored in the external storing device,
  (iii) reads out the self-program file from the external storing device and stores the self-program file in a storing section of the image processing apparatus when the self-program file is determined to be stored in the external storing device,
  (iv) obtains identification information capable of using data stored in a storing section of the external storing device to correspond to the distinguishment information in response to determining that the self program file is stored in the external storing device,
  (v) generates an encoded identification information that is an encoding of the identification information using the first distinguishment information and the second distinguishment information,
  (vi) stores the encoded identification information in the external storing device, and
  (vii) deletes the self program file from the external storing device after the identification information is obtained, wherein the self program file is stored in the external storing device before the external storing device is installed to the image forming apparatus; and a second program section executable by the image forming apparatus that:
(i) obtains the encoded identification information from the first program section,
(ii) obtains the distinguishment information fixedly belonging to the image forming apparatus from the image forming apparatus,
(iii) generates a decoded identification information that is a decoding of the encoded identification information using the distinguishment information, and
(iv) determines a use permission or non-use permission of the program that is stored in the external storing device based on the decoded identification information.

9. The external storing device of claim 1, wherein the storage portion further stores a random numeral file for making the identification information.

10. The external storing device of claim 2, wherein the storage portion further stores a random numeral file for making the identification information.

11. The external storing device of claim 3, wherein the storage portion further stores a random numeral file for making the identification information.

12. The external storing device of claim 4, wherein the storage portion further stores a random numeral file for making the identification information.

13. The image processing apparatus of claim 5, wherein the storage portion further stores a random numeral file for making the identification information.

14. The image processing apparatus of claim 6, wherein the storage portion further stores a random numeral file for making the identification information.

15. The image forming apparatus of claim 7, wherein the storage portion further stores a random numeral file for making the identification information.

16. The image form of claim 8, wherein the storage portion further stores a random numeral file for making the identification information.

17. The image processing apparatus of claim 5, further comprising:
a controller which reads out a program from the external storing device; and
a memory which temporarily stores the program read out from the external storing device.

18. The image processing apparatus of claim 17, wherein the controller judges whether the self program file is stored in the external storing device, and in the case that it is judged that the self program file is stored, reads out the self program file from the external storing device and stores the self program file in the memory.

19. The image processing apparatus of claim 6, further comprising:
a controller which reads out a program from the external storing device; and
a memory which temporarily stores the program read out from the external storing device.

20. The image processing apparatus of claim 19, wherein the controller judges whether the self program file is stored in the external storing device, and in the case that it is judged that the self program file is stored, reads out the self program file from the external storing device and stores the self program file in the memory.

21. The image forming apparatus of claim 7, further comprising:
a controller which reads out a program from the external storing device; and
a memory which temporarily stores the program read out from the external storing device.

22. The image forming apparatus of claim 21, wherein the controller judges whether the self program file is stored in the external storing device, and in the case that it is judged that the self program file is stored, reads out the self program file from the external storing device and stores the self program file in the memory.

23. The image forming apparatus of claim 8, further comprising:
a controller which reads out a program from the external storing device; and
a memory which temporarily stores the program read out from the external storing device.

24. The image forming apparatus of claim 23, wherein the controller judges whether the self program file is stored in the external storing device, and in the case that it is judged that the self program file is stored, reads out the self program file from the external storing device and stores the self program file in the memory.

25. The external storing device of claim 1, wherein the first distinguishment information is a serial number.

26. The external storing device of claim 1, wherein the second distinguishment information is fixed data that is not obtained from an external apparatus.

27. The external storing device of claim 2, wherein the first distinguishment information is a serial number.

28. The external storing device of claim 2, wherein the second distinguishment information is fixed data that is not obtained from an external apparatus.

29. The external storing device of claim 3, wherein the first distinguishment information is a serial number.

30. The external storing device of claim 3, wherein the second distinguishment information is fixed data that is not obtained from an external apparatus.

31. The external storing device of claim 4, wherein the first distinguishment information is a serial number.

32. The external storing device of claim 4, wherein the second distinguishment information is fixed data that is not obtained from an external apparatus.

33. The image processing apparatus of claim 5, wherein the first distinguishment information is a serial number.

34. The image processing apparatus of claim 5, wherein the second distinguishment information is fixed data that is not obtained from an external apparatus.

35. The image processing apparatus of claim 6, wherein the first distinguishment information is a serial number.

36. The image processing apparatus of claim 6, wherein the second distinguishment information is fixed data that is not obtained from an external apparatus.

37. The image forming apparatus of claim 7, wherein the first distinguishment information is a serial number.

38. The image forming apparatus of claim 7, wherein the second distinguishment information is fixed data that is not obtained from an external apparatus.

39. The image forming apparatus of claim 8, wherein the first distinguishment information is a serial number.

40. The image forming apparatus of claim 8, wherein the second distinguishment information is fixed data that is not obtained from an external apparatus.

* * * * *